United States Patent [19]

Shockley

[11] 4,181,035

[45] Jan. 1, 1980

[54] CONNECTING LINK FOR MINING CHAIN

[75] Inventor: Thomas D. Shockley, Gahanna, Ohio

[73] Assignee: Dresser Industries, Inc., Dallas, Tex.

[21] Appl. No.: 828,396

[22] Filed: Aug. 29, 1977

[51] Int. Cl.$^2$ ............................................. F16G 13/02
[52] U.S. Cl. .................................... 74/250 R; 74/258; 299/82
[58] Field of Search ...................... 74/258, 250 R, 248, 74/249; 299/82, 58

[56] References Cited

U.S. PATENT DOCUMENTS

| 3,096,661 | 7/1963 | Reinsmaetal | 74/258 |
| 3,659,112 | 4/1972 | Stedman | 74/258 |

*Primary Examiner*—Ronald C. Capossela

*Attorney, Agent, or Firm*—Paul E. Krieger; John M. Lorenzen

[57] ABSTRACT

An improved connecting link for a mining chain includes two half links and means for fastening them together. Each half link has a laterally extending bore for receiving the link pin at one end of the chain. At least one of the half links has a laterally extending wedge-shaped projection pointed toward the other half link, while the other half link has a mating recess with inclined walls corresponding to converging walls of the wedge-shaped projection. When assembled, the projection of the one half link snugly engages the recess of the other half link such that the pulling forces in the chain are transmitted directly from one half link to the other rather than through the fastening means. The fastening means can be removed even when the chain is operated between adjacent chains.

2 Claims, 5 Drawing Figures

CONNECTING LINK FOR MINING CHAIN

The invention relates to mining chains such as are frequently used in combination with a rotary auger on continuous mining machines. More specifically, it concerns an improved connecting link for such chains which among other advantages allows the assembly or disassembly of a center chain in a multiple, side-by-side chain arrangement without having to remove any adjacent chains.

Present day continuous coal mining machines typically have a rotary pick-carrying drum or auger supported by arms from the front of a mobile chassis or frame. The machine is usually designed so that a relatively heavy, pick-carrying chain extends around the auger and the auger support arm. These chains are called trim chains and cut clearance in the mine face to allow the machine to keep advancing. Usually the auger head is driven through gearing internal of the support arm, but in some cases the trim chains may also function as power transmission chains.

Relative to the auger head, the trim chains are relatively narrow and are usually spaced several inches apart. This leaves a space between them in which the auger must be fitted with bits to mine that section of the coal face. However, it has been found preferable in some cases to simply put a sprocket at the center of the auger and wrap a circumferential length of mining chain around it. This is one example where multiple, side-by-side chains are used. Another example is on the miners referred to previously where multiple side-by-side strands of chain are actually used to drive the cutting head.

With multiple strand chains, or in the case of the center auger chain described above, it frequently happens that the center chain needs to be removed or replaced. Since most connecting links for chains depend upon a laterally removable pin, and since there is little free space in or about the mining machine itself, the center chain or strand cannot be easily removed without first removing one of the adjacent outer strands.

No particularly satisfactory connecting link suitable to solve the aforementioned problem had been found heretofore. There have been attempts to provide a connecting link with a connecting pin or bolt which could be removed radially (as related to the chain as it passes around a sprocket). These were often unsatisfactory because the proposed connecting link was substantially weaker than the rest of the chain, normally because the load was transmitted through the connecting pin. Another attempt involved a nut attached to each half of the connecting link with a threaded rod extending between them in the manner of a turnbuckle. This also proved clumsy and weak.

It is therefore the object of the invention to provide a connecting link suitable for use in a center strand of a multiple strand mining chain which enables the central strand to be removed or installed without the need to remove any adjacent strands.

It is another object to provide such a connecting link which, though easily disconnectable, is when connected substantially as strong as the other links in the strand.

Finally, it is an object to provide a center auger chain for a continuous drum-type mining machine which incorporates a connecting link having the foregoing features.

These and other objects are achieved by the connecting link for mining chain shown in the accompanying drawings and described in detail hereinafter. The connecting link comprises two disconnectable halves which for convenience will be referred to as the upper half and the lower half. In the one embodiment shown and described the two halves are nearly identical, but a further understanding of the invention will reveal that the two parts need not necessarily be so similar.

When assembled, the two parts resemble and replace a block link in a chain comprising a row of spaced block links successively joined by side bars which overlap the ends of the block links. In a mining chain, the side bars are often replaced by staggered outer rows of block links so that all three rows can be fitted with cutting picks or bits to make a wider cut in the mine face. In both cases, the various links and/or side bars are joined by link pins which extend through colinear lateral bores in the links or side bars.

Both upper and lower halves of the new connecting link have a link pin receiving bore extending laterally through them near one end. The upper half has a downwardly directed wedge-shaped projection spaced from the bore. The region between the bore and the projection is relieved to form a truncated V-shaped recess with one of its diverging walls being common with one wall of the wedge-shaped projection. Similarly, the lower half has an upwardly directed, wedge-shaped projection and a truncated V-shaped recess between its bore and its projection. Again, one wall of the wedge-shaped projection is common to one wall of the recess. The half links are so sized and shaped that when joined together the wedge-shaped projection of one mates snugly in the recess of the other and the lateral bores are aligned and spaced similar to the other block links in that row.

The two halves of the connecting link are rigidly joined by a fastening means which passes through them in the radial direction (again viewing the chain as it passes over a sprocket). In the embodiment shown, the fastening means is a bolt which passes freely through an opening in one half and screws into a threaded hole in the other half.

It is a feature of the invention that the mating wedge projections and recesses automatically align the holes for the fastening means in one plane, thus making assembly much easier. It is a further, and perhaps more important, feature that the snug fit of the wedge projections and recesses give the connecting link strength in the chain pull direction substantially as great as, if not equal to, the strength of a solid block link. The mating engagement of the two halves transmits the chain load directly through the contacting surfaces of the two halves without putting the fastening means in shear. And finally, a connecting link made in accordance with the teaching of the invention can be readily and economically manufactured using well known techniques.

Other features and advantages of the invention will be apparent from the more detailed description which follows with specific reference to the accompanying drawings, which form part of this specification, and of which:

Figure 1:
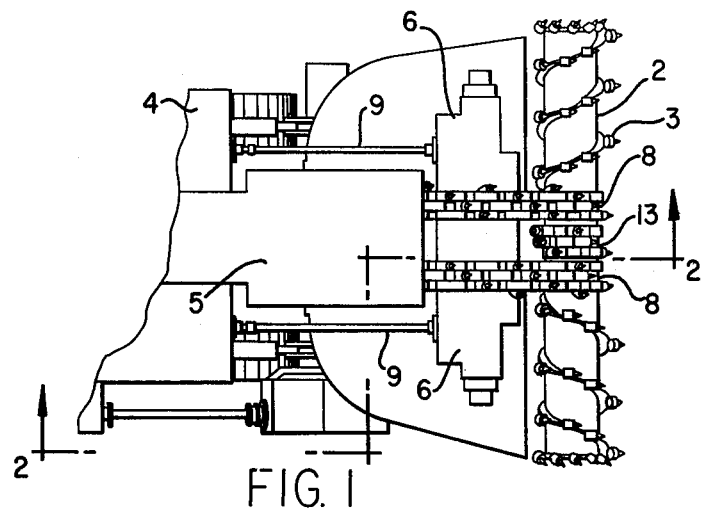
FIG. 1 is a plan view of the cutting head portion of a typical continuous mining machine which represents one particular application for the present invention.
Figure 2:
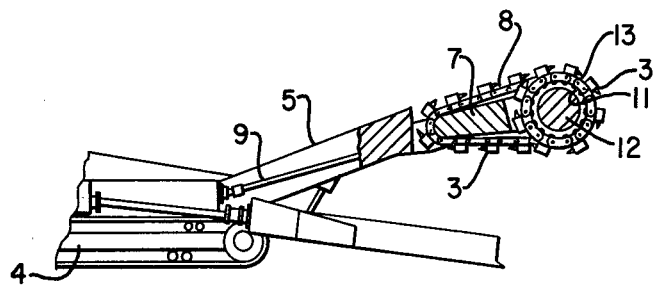
FIG. 2 is a side elevation view, partly in cross section, of the cutting head of FIG. 1.

The typical mining machine represented in FIGS. 1 and 2 has a rotating drum or auger 2 laced with mining picks or bits 3 to cut material from the mine face. The auger is supported from the forward end of a mobile chassis 4 by a pivotably mounted support structure 5 which includes the auger gear case 6 and a pair of support arms 7. Power from a motor (not shown) on the chassis 4 is transmitted through the universal shafts 9 to the gear case 6 and then through internal gearing within the support arms 7 to rotatably drive the auger 2.

Each of a pair of trim chains 8 extending around the auger 2, a support arm 7 and through an opening in the support structure 5 behind the gear case 6. The trim chains 8 are also fitted with a pattern of bits 3 and cut clearance for the advancing support arms 7.

The forward space between the trim chains 8 was formerly taken by a special cylindrical section of the auger 2. The center section is somewhat costly to manufacture and can be difficult to handle in the mine if replacement, because of broken bit blocks or otherwise, becomes necessary. Therefore, on some machines, the center auger section has been replaced by a sprocket 11 fitted to tha auger shaft 12 and a center auger chain 13 wrapped circumferentially around the sprocket. The center auger chain 13 is also provided with mining bits 3 and together with the trim chains 8 cuts the central region of the mine face.

Because the center auger chain 13 is positioned closely between the two trim chains 8, and because the space between the auger 2 and the gear case 6 is narrow, conventional chain connecting links are not satisfactory for use with the chain 13. Such conventional connecting links have laterally removable fastening means or connecting pins which cannot be removed or inserted in this case unless one of the trim chains 8 is removed first. Since these mining chains are heavy and difficult to handle, the otherwise unnecessary removal and replacement of an adjacent trim chain 8 is to be avoided if possible.

Figure 3:
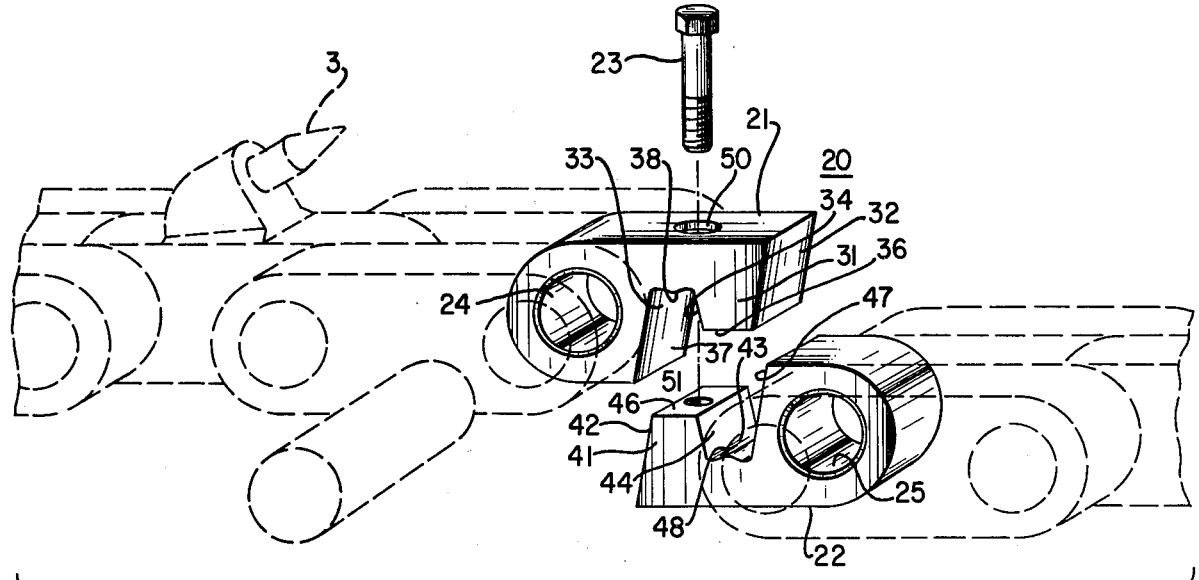
FIG. 3 is an exploded isometric view of a connecting link for a mining chain as designed in accordance with the invention.
Figure 4:
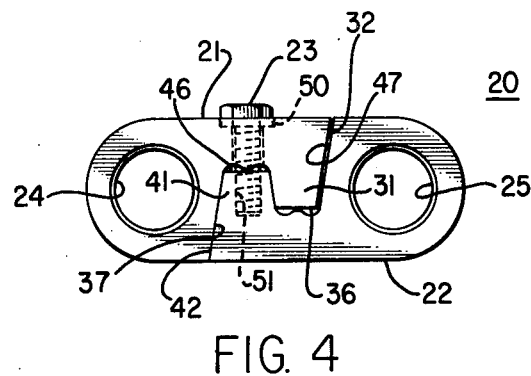
FIG. 4 is a side elevational view of the assembled connecting link from FIG. 3.
Figure 5:
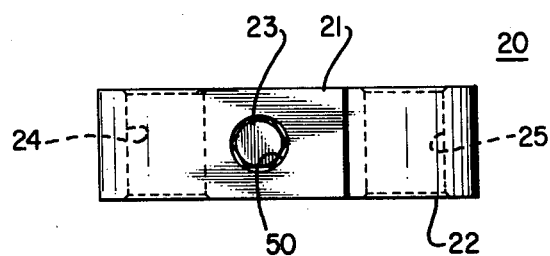
FIG. 5 is a top view of the assembled connecting link of FIG. 3.

By using the unique connecting link, indicated generally at 20 in FIGS. 3-5, the foregoing problem is avoided. As shown in FIG. 3, the connecting link 20 is substituted in place of a conventional block link in the center row. The center block links are connected together by staggered rows of outer block links, which also carry mining bits, and connecting pins passing through co-aligned bores in the overlapping links.

The connecting link 20 comprises two halves, indicated respectively as shown as upper half 21 and lower half 22, and a fastening means 23. The upper half 21 has a laterally extending bore 24 sized to receive a conventional link pin for connection to one end of the mining chain. Similarly, the lower half 22 has a lateral bore 25 for receiving a link pin for connection to the other end of the mining chain.

The body of the upper half surrounds the bore 24, and in that region is generally the full thickness of a block link. The body extends in the chain direction along its upper surface. A projection 31, the same width as the link and having a truncated wedge-shaped cross section, extends downwardly from the extended region of the body of upper half 21. The projection 31 has converging inclined walls 32 and 34 and a flat crown 36. The space between the projection 31 and the bore 24 is relieved to form a recess 33 having a cross section generally resembling a truncated V. The recess 33 has diverging sidewalls 34 and 37, the first of which is common to the projection 31. The bottom of the recess is indicated at 38.

The lower half 22 of the connecting link also has a body which is generally the thickness of a block link in the region surrounding its bore 25, but extends in the chain direction along its lower surface. A projection 41 similar to the wedge-shaped projection 31, extends upward from the extended region of the body of the lower half 22. The projection 41 has converging sidewalls 42 and 44, and a flat crown 46. The space between the projection 31 and the bore 25 is relieved and forms a recess 43 generally similar to the recess 33 of the upper half. The recess 43 has diverging sidewalls 44 and 47, the first of which is common to the projection 41, and a bottom 48.

The two halves 21 and 22 of the connecting link are so designed that when assembled the projection 31 of the upper half 21 seats snugly against the diverging walls of the recess 43 in the lower half 22, and conversely the projection 41 seats firmly against the walls of the recess 33. The two halves are fastened together by the fastening means 23 which in the embodiment shown is a bolt. The bolt 23 passes through opening 50 which extends through the bottom 38 of the recess 33 and is threaded into the tapped hole 51 extending through the crown 46 and into the projection 41. The opening 50 can be countersunk to recess the head of the bolt 23 in applications where interference may occur. Because of the mating between the projections 31 and 41 and recesses 43 and 33 respectively, the holes 50 and 51 are readily aligned for insertion of the bolt 23.

In operation, with the chain under load and in tension, the forces are transmitted directly from one half of the link 20 to the other and without putting the fastening means in shear. Thus if the upper half 21 is doing the pulling, the wall 34 of its projection 31 bears and pulls directly against the wall 44 of the projection 41 of the lower half 22. This feature gives the connecting link 20 strength nearly equal to that of a solid block link.

In order to relax the manufacturing tolerances for the link 20, and because complete mating engagement between both pairs of projections and recesses is not necessary, a little clearance can be provided between one pair. This also helps in assembly of the two half links. Thus as seen in FIG. 4, either the wall 32 or the wall 47 has been machined to leave a small clearance gap between the projection 31 and recess 43.

Having thus briefly described the invention with reference to one embodiment, other embodiments, modifications, and applications of or for the invention will readily appear to those who understand it.

The embodiments of the invention in which an exclusive property or privilege is claimed are defined as follows:

1. A connecting link for a mining chain, comprising:
a first half link having a laterally extending bore for receiving a link connecting pin of the chain, a tapered projection spaced from said bore and extending perpendicular to the chain pitch line across the width of said half link and having a cross section comprising two inclined sidewalls converging along an axis also perpendicular to the chain pitch line, and an opening in said projection along the axis of said converging sidewalls;

a second half link having a laterally extending bore for receiving another link connecting pin of the chain, an elongated recess extending perpendicular to the chain pitch line and having a cross section comprising two inclined sidewalls diverging along an axis also perpendicular to the chain pitch line, and an opening in said recess along the axis of said diverging sidewalls;

whereupon joining said two half links the projection of the first half link seats snugly in the recess of the second half link with the sidewall of the projection in mating contact with the corresponding sidewalls of the recess such that said pin receiving bores are aligned parallel to each other and the openings in said projection and said recess are co-axially aligned; and means insertable in said aligned openings to fasten said first and second half links rigidly together.

2. A connecting link as described in claim 1, wherein the opening in either said projection or said recess extends through said projection or recess, and the opening in the other of said projection or recess is threaded, and wherein said fastening means is a bolt connecting said half links together.

* * * * *